United States Patent
Kim

(10) Patent No.: US 6,970,502 B2
(45) Date of Patent: Nov. 29, 2005

(54) METHOD FOR PROVIDING HIGH-SPEED DATA SERVICE AND VOICE SERVICE

(75) Inventor: Il-Kyong Kim, Songnam-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1075 days.

(21) Appl. No.: 09/839,156

(22) Filed: Apr. 23, 2001

(65) Prior Publication Data

US 2002/0003802 A1   Jan. 10, 2002

(30) Foreign Application Priority Data

Jul. 6, 2000   (KR)   ............................ 2000-38567

(51) Int. Cl.[7] ............................ H04B 1/38; A04L 5/16
(52) U.S. Cl. .................................. 375/222; 370/485
(58) Field of Search ........................ 375/222; 370/356, 370/485

(56) References Cited

U.S. PATENT DOCUMENTS

| | | | |
|---|---|---|---|
| 5,910,970 A | 6/1999 | Lu | |
| 5,978,390 A | 11/1999 | Balatoni | |
| 6,021,158 A | 2/2000 | Schurr et al. | |
| 6,021,167 A | 2/2000 | Wu | |
| 6,044,107 A | 3/2000 | Gatherer et al. | |
| 6,075,784 A * | 6/2000 | Frankel et al. | 370/356 |
| 6,137,866 A | 10/2000 | Staber et al. | |
| 6,141,356 A | 10/2000 | Gorman | |
| 6,144,659 A | 11/2000 | Nye et al. | |
| 6,192,109 B1 | 2/2001 | Amrany et al. | |
| 6,693,916 B1 * | 2/2004 | Chaplik et al. | 370/485 |

* cited by examiner

*Primary Examiner*—Stephen Chin
*Assistant Examiner*—Curtis Odom
(74) *Attorney, Agent, or Firm*—Robert E. Bushnell, Esq.

(57) ABSTRACT

Providing a high-speed data service and voice service in a transmission system employing two binary, one quarternary (2B1Q) modulation/demodulation, using a high-speed data service remote terminal, a plurality of user data service and voice service terminals, and a multi-rate digital subscriber line (MDSL) terminal connected to the remote terminal through a twisted pair line, and to the user terminals. During downstream voice service, the remote terminal assembles and transmits an high bit rate digital subscriber line (HDSL) frame by including signaling signals for the voice service and signal processing mode information in a user-defined interval of the high bit rate digital subscriber line frame, to the multi-rate digital subscriber line terminal through the twisted pair line. During upstream voice service, the remote terminal receives the high bit rate digital subscriber line frame and transmits the signaling signals received to an exchange.

62 Claims, 5 Drawing Sheets octet  IDLC MODE

| 4 | ACT1 | 1 | MB1 | RING TYPE | RING1 |
| 5 | ACT2 | 1 | MB2 | RING TYPE | RING2 |
| 6 | CHECK-SUM |||||

FIG. 3A octet  UDLC MODE

| 4 | ACT1 | 0 | MB1 | A1 | B1 | C1 | D1 |
| 5 | ACT2 | 0 | MB2 | A2 | B2 | C2 | D2 |
| 6 | CHECK-SUM |||||||

FIG. 3B

METHOD FOR PROVIDING HIGH-SPEED DATA SERVICE AND VOICE SERVICE

CLAIM OF PRIORITY

This application claims priority to an application entitled "Method for Providing High-speed Data Service and Voice Service" filed in the Korean Industrial Property Office on Jul. 6, 2000 and assigned Ser. No. 2000-38567, the contents of which are hereby incorporated by reference.

BACKGROUND OF THE INVENTION

1. Technical Field

The present invention relates generally to a transmission system, and in particular, to a transmission system capable of providing both a data service and a voice service.

2. Related Art

An x-digital subscriber line (xDSL) technique is typically used to provide a high-speed data service using an existing telephone line. The xDSL chiefly includes asymmetrical digital subscriber line (ADSL), universal asymmetrical digital subscriber line (UADSL), high bit rate digital subscriber line (HDSL), symmetrical digital subscriber line (SDSL), multi-rate symmetrical digital subscriber line (MSDSL), rate adaptive digital subscriber line (RADSL), very high digital subscriber line (VDSL), and also IDSL (ISDN like DSL) wherein ISDN is integrated services digital network.

ADSL supports both a high-speed data service and a standard voice service through a twisted pair copper line. The ADSL is advantageous in that it is currently widespread and supports a high downstream rate of up to 7 megabits per second (Mbps). However, the ADSL is disadvantageous in that its upstream rate is limited to a maximum of 800 kilobits per second (Kbps).

The high bit rate digital subscriber line (HDSL) is a preliminary technique for an alternative proposal of T1 (1.544 Mbps) and E1 (2.048 Mbps), which uses 2 twisted pair lines, and is advantageous in that it supports a maximum sync rate of T1 and E1, and it has no repeater between a subscriber and a telephone exchange. However, the HDSL is disadvantageous in that it does not support the standard telephone service and the variable rate, and its downstream rate is limited to the E1 class.

The multi-rate symmetrical digital subscriber line (MSDSL) is a preliminary technique for an alternative proposal of T1 and E1, which uses 1 twisted pair line, and is equal to the HDSL except that it provides the variable rate. The MSDSL is advantageous in that it has somewhat eased distance requirements at the low rate. However, the MSDSL is disadvantageous in that it cannot support the standard telephone service.

More specifically, the multi-rate symmetrical digital subscriber line (MSDSL), a descendant of the symmetrical digital subscriber line (SDSL), is a full duplex sync technique operating at a rate of below E1 or T1, using a single circuit pair, and is distinguishable from the HDSL or the HDSL2 (HDSL version 2) in that it can support several data rates. For example, the MSDSL supports a variable rate of between 128 Kbps and 1920 Kbps. The MSDSL employs a two binary, one quaternary (2B1Q) circuit modulation/demodulation technique, which has high noise immunity.

More specifically describing the HDSL, the HDSL supports a fixed rate (that is, does not support a variable rate). Therefore, the HDSL operates in a T1/E1 full duplex mode, and thus, requires a 2-pair line or 3-pair line. The HDSL or the HDSL2 can support only the high data rate (for example, over the rate of the T1 class). For the circuit modulation/demodulation technique of the HDSL and HDSL2, a carrierless amplitude phase (CAP) technique and the 2B1Q technique are used both, but the two binary, one quarternary (2B1Q) technique is chiefly used. The CAP technique is advantageous in that it has a relatively longer service distance as compared with the 2B1Q technique, while the 2B1Q technique is advantageous in that it has high noise immunity though it has a shorter service distance as compared with the CAP technique. The 2B1Q technique uses the same band for both the upstream and downstream signals, and modulates 2 binary signals into 1 quaternary signal. The 2B1Q technique is used not only for the HDSL but also for the IDSL and SDSL. The carrierless amplitude phase (CAP) technique, which is a quadrature amplifier modulation-based modulation/demodulation technique, is used for SDSL, ADSL and RADSL as well as HDSL. The quadrature amplifier modulation is represented by the acronym QAM.

Meanwhile, since the existing multi-rate symmetrical digital subscriber line (MSDSL) can support only the data service, a separate card capable of supporting the voice service must be provided in order to receive the voice service. The MSDSL is advantageous in that it can provide the data service using 1 twisted pair copper line (that is, existing telephone line), but it is disadvantageous in that the separate card, as stated above, is required to be provided with the voice service (or standard telephone service). In addition, for the voice service, there must be separately provided a splitter and a voice service line interposed between the splitter and the user terminal.

The widespread integrated services digital network (ISDN) service is so developed as to provide both the voice service and the data service, but it supports a low data rate of 128 Kbps, having the limited service quality. In addition, the exchange must process messages exchanged between a network terminal (NT) and the exchange itself, which increases a load on the exchange.

In the meantime, the ADSL can transmit the voice and data signals by mixing them using a discrete multi-tone (DMT) technique. In this case, the voice signal is split from the mixed signal by a splitter in the final stage. The DMT technique for the ADSL is disadvantageous in that a separate splitter must be provided to split the voice signal as in the MSDSL.

As described above, since the digital subscriber line technique such as ADSL, HDSL and MSDSL can support only the high-speed data service (excluding the standard telephone service), a separate device must be installed to support the voice service. In addition, when the user installs the separate device and subscribes to both the high-speed data-class service (hereinafter referred to as a high-speed data service) and the voice-class service (hereinafter referred to as a voice service), a separate line must be additionally installed. Therefore, in view of the financial aspect of the client, it is actually difficult to universalize such a technique.

I have found that methods for providing data services and voice services can be difficult, costly, inefficient, and inconvenient to implement. Efforts have been made to improve data and voice services.

Exemplars of recent efforts in the art include: U.S. Pat. No. 5,978,390 to Balatoni, entitled DUAL DDS DATA MULTIPLEXER, issued on Nov. 2, 1999, U.S. Pat. No. 6,137,866 to Staber et al., entitled INDOOR XDSL SPLITTER ASSEMBLY, issued on Oct. 24, 2000, U.S. Pat. No. 6,144,659 to Nye et al., entitled TELECOMMUNICATION EQUIPMENT SUPPORT OF HIGH SPEED DATA SERVICES, issued on Nov. 7, 2000, U.S. Pat. No. 6,141,356 to Gorman, entitled SYSTEM AND METHOD FOR DISTRIBUTING VOICE AND DATA INFORMATION OVER WIRELESS AND WIRELINE NETWORKS, issued on Oct. 31, 2000, U.S. Pat. No. 6,192,109 to Amrany et al., entitled APPARATUS AND METHOD FOR IMPROVED DSL COMMUNICATION, issued on Feb. 20, 2001, U.S. Pat. No. 5,910,970 to Lu, entitled MDSL HOST INTERFACE REQUIREMENT SPECIFICATION, issued on Jun. 8, 1999, U.S. Pat. No. 6,021,158 to Schurr et al., entitled HYBRID WIRELESS WIRE-LINE NETWORK INTEGRATION AND MANAGEMENT, issued on Feb. 1, 2000, U.S. Pat. No. 6,021,167 to Wu, entitled FAST EQUALIZER TRAINING AND FRAME SYNCHRONIZATION ALGORITHMS FOR DISCRETE MULTI-TONE (DMT) SYSTEM, issued on Feb. 1, 2000, and U.S. Pat. No. 6,044,107 to Gatherer et al., entitled METHOD FOR INTEROPERABILITY OF A TIE 1.4 COMPLIANT ADSL MODEM AND A SIMPLER MODEM, issued on Mar. 28, 2000.

While these recent efforts provide advantages, I note that they fail to adequately provide a method for efficiently and conveniently providing data and voice services.

SUMMARY OF THE INVENTION

It is, therefore, an object of the present invention to provide a method capable of providing both a high-speed data service and a voice service using a voice-class line.

In accordance with one aspect of the present invention, there is provided a method for providing a high-speed data service and a voice service in a transmission system employing a 2B1Q modulation/demodulation technique, the transmission system including a remote terminal providing a high-speed data service, a plurality of user terminals including data service terminals and voice service terminals, and an multi-rate digital subscriber line (MDSL) terminal connected to the remote terminal through a twisted pair line, the MDSL terminal being also connected to the user terminals. During a downstream voice service, the remote terminal assembles an high bit rate digital subscriber line (HDSL) frame by including signaling signals for the voice service and signal processing mode information in a user-defined interval of the HDSL frame, and transmits the assembled HDSL frame to the MDSL terminal through the twisted pair line. During an upstream voice service, the remote terminal receives the HDSL frame and transmits the signaling signals in the received HDSL frame to an exchange.

In accordance with another aspect of the present invention, there is provided a method for providing a high-speed data service and a voice service in a transmission system employing a 2B1Q modulation/demodulation technique, the transmission system including a remote terminal providing a high-speed data service, a plurality of user terminals including data service terminals and voice service terminals, and an MDSL terminal connected to the remote terminal through a twisted pair line, the MDSL terminal being also connected to the user terminals. During a downstream voice service, the MDSL terminal receives an HDSL frame which is assembled by the remote terminal by including signaling signals for the voice service and signal processing mode information in a user-defined interval of the HDSL frame, and couples the signaling signals to the voice service terminal. Upon receipt of a voice service response and request from the voice service terminal, the MDSL terminal assembles the HDSL frame by including the signaling signals for the voice service and the signal processing mode information in the user-defined interval and transmits the assembled HDSL frame to the remote terminal through the twisted pair line. A downstream voice service can be a phone call to the telephone 42, as shown in FIG. 1, in accordance with the principles of the present invention. An upstream voice service can be a phone call from telephone 42. An upstream voice service can be voice data being sent from telephone 42 to a remote telephone (not shown) through MDSL terminal 40.

The two binary, one quarternary (2B1Q) multirate digital subscriber line (MDSL) system according to the present invention provides both the high-data rate service of the multirate symmetrical digital subscriber line (MSDSL) and the voice service using a voice-class line.

To achieve these and other objects in accordance with the principles of the present invention, as embodied and broadly described, the present invention provides a method, comprising: providing high speed data services and voice services in a transmission system employing two binary, one quaternary modulation/demodulation, the transmission system including a remote terminal providing a high-speed data service, a plurality of user terminals including data service terminals and voice service terminals, and a multirate digital subscriber line terminal connected to the remote terminal through a twisted pair line, the multirate digital subscriber line terminal being connected to the user terminals, the voice services including upstream and downstream voice services; during the downstream voice service, assembling, in the remote terminal, a first high bit rate digital subscriber line frame by including signaling signals for the voice service and signal processing mode information in a user-defined interval of the first high bit rate digital subscriber line frame, and transmitting the assembled first high bit rate digital subscriber line frame to the multirate digital subscriber line terminal through the twisted pair line; and during the upstream voice service, receiving, in the remote terminal, a second high bit rate digital subscriber line frame and transmitting signaling signals in the received second high bit rate digital subscriber line frame to an exchange.

To achieve these and other objects in accordance with the principles of the present invention, as embodied and broadly described, the present invention provides a method, comprising: forming a transmission system providing high speed data services and voice services, the transmission system including a multirate digital subscriber line terminal, a plurality of data terminals and voice terminals, and a remote terminal providing the high speed data services, the voice terminals including a first voice terminal; receiving a first high bit rate digital subscriber line frame in the multirate digital subscriber line terminal during a downstream voice service, the first high bit rate digital subscriber line frame being assembled to include signaling signals for the voice service and signal processing mode information in a user-defined interval of the first high bit rate digital subscriber line frame, the first high bit rate digital subscriber line frame being assembled by the remote terminal; coupling the signaling signals to the first voice terminal; when a voice service response and request is received from the first voice terminal, assembling a second high bit rate digital subscriber line frame by including signaling signals for the voice service and signal processing mode information in a user-defined interval of the second high bit rate digital subscriber line frame; and transmitting the second high bit rate digital subscriber line frame.

To achieve these and other objects in accordance with the principles of the present invention, as embodied and broadly described, the present invention provides an apparatus, comprising: a transmission system employing two binary, one quaternary modulation/demodulation and providing high speed data services and voice services, the transmission system comprising: a remote terminal providing a high-speed data service; a plurality of user terminals including data service terminals and voice service terminals; a multi-rate digital subscriber line terminal being connected to the remote terminal through a twisted pair line, and being connected to the user terminals; when the voice services correspond to a downstream voice service, the remote terminal assembling a first high bit rate digital subscriber line frame by including signaling signals for the downstream voice service and signal processing mode information in a user-defined interval of the first high bit rate digital subscriber line frame, and the remote terminal transmitting the assembled first high bit rate digital subscriber line frame to the multirate digital subscriber line terminal through the twisted pair line; and when the voice services correspond to an upstream voice service, the remote terminal receiving a second high bit rate digital subscriber line frame and transmitting signaling signals in the received second high bit rate digital subscriber line frame to an exchange.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

FIGS. 3A and 3B are diagrams illustrating a format of an internal message transmitted from a remote terminal to a multirate digital subscriber line (MDSL) terminal, in accordance with the principles of the present invention;

DETAILED DESCRIPTION OF THE PREFERRED EMBODIMENT

While the present invention will be described more fully hereinafter with reference to the accompanying drawings, in which preferred embodiments of the present invention are shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Illustrative embodiments of the invention are described below. In the interest of clarity, not all features of an actual implementation are described. In the following description, well-known functions or constructions are not described in detail since they would obscure the invention in unnecessary detail. It will be appreciated that in the development of any actual embodiment numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill having the benefit of this disclosure.

Figure 1:
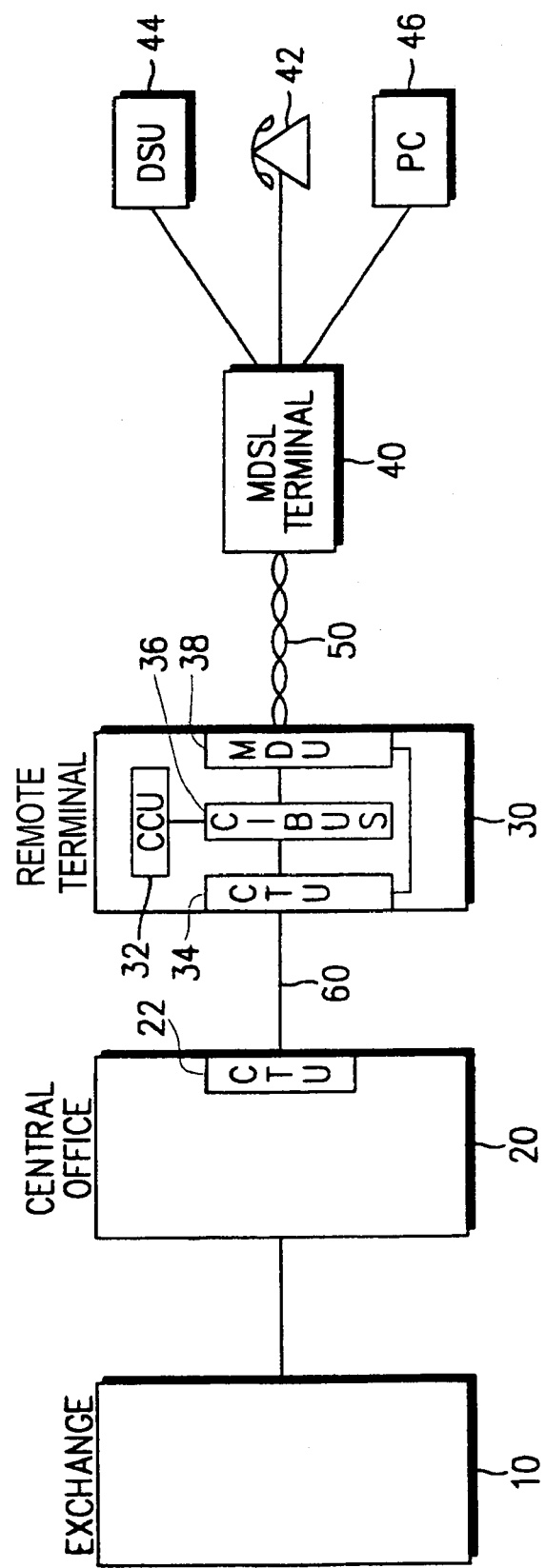
FIG. 1 is a block diagram illustrating a transmission system, in accordance with the principles of the present invention.

FIG. 1 illustrates a block diagram of a transmission system according to an embodiment of the present invention. The transmission system includes an exchange 10, a central office (CO) 20, a remote terminal (RT) 30, and a multirate digital subscriber line (MDSL) terminal 40. It should be noted that FIG. 1 shows a scheme for processing an internal message in a universal digital line circuit (UDLC) mode and an integrated digital line circuit (IDLC) mode according to an embodiment of the present invention. The UDLC and IDLC are used for voice signal processing between the exchange 10 and an optical subscriber transmission device (including the central office 20 and the remote terminal 30). With regard to a difference between them, the UDLC mode implements the signal processing by hardware, while the IDLC mode implements the signal processing by software.

Referring to FIG. 1, the MDSL terminal 40 includes voice ports for providing a voice-class service (hereinafter referred to as a voice service) and data ports for providing a high-speed data-class service (hereinafter referred to as a high-speed data service). In the embodiment of the present invention, a plurality of user terminals can be connected to the voice ports and data ports of the MDSL terminal 40. The "user terminals" include a telephone 42, a data service unit (DSU) 44, and a personal computer (PC) 46. Preferably, the MDSL terminal 40 includes 2 voice ports (voice port #1 and voice port #2), 1 data port supporting a V.35 interface, and 10 data ports supporting a base-T interface. The telephone 42 can represent a plurality of telephones or voice service terminals, the data service unit 44 can represent a plurality of data units, and the personal computer 46 can represent a plurality of computers.

The remote terminal 30 includes a channel control unit (CCU) 32, a C-trunk unit (CTU) 34, a C-bus 36, and a multirate digital subscriber line unit (MDU) 38. An existing telephone line 50, i.e., one twisted pair copper line, is interconnected between the CTU 38 of the remote terminal 30 and the MDSL terminal 40. An E1/T1 trunk 60 is interconnected between a CTU 22 of the central office 20 and the CTU 34 of the remote terminal 30.

The two binary, one quarternary (2B1Q) multirate symmetrical digital subscriber line (MSDSL) system provides a data-class service. Thus, to transmit voice data, a separate signal processing scheme is required. The two binary, one quarternary (2B1Q) multirate digital subscriber line (MDSL) system according to an embodiment of the present invention transmits the voice data using HOH (HDSL overhead) bits included in an HDSL frame format.

Figure 2:
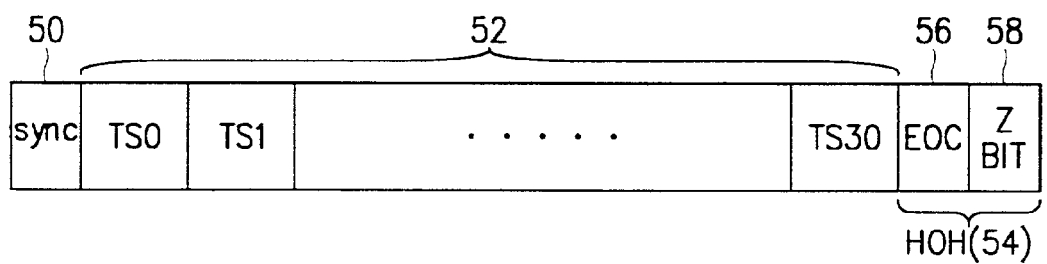
FIG. 2 is a diagram illustrating a high bit rate digital subscriber line (HDSL) frame format.

FIG. 2 illustrates an HDSL frame format in which HOH bits are included. Referring to FIG. 2, the HDSL frame includes a sync signal field (Sync) 50, 32 time slot fields (TS0–TS31) 52 associated with 32 channels, and an HOH-bit field 54. One HDSL frame has a period of 6 milliseconds (ms). The HOH-bit field 54 is comprised of an EOC (embedded operation communication) field 56 used for remote controlling, and a Z-bit field 58 which can be defined by the user. The Z-bit field 58 is comprised of 8 octets.

In the embodiment of the present invention, the internal message, transmitted from the remote terminal 30 to the MDSL terminal 40 or transmitted in a reverse direction, is defined using the $4^{th}$ to $6^{th}$ octets of the Z-bit field 58. Although the invention will be described with reference to an example where the internal message is constructed using the $4^{th}$ to $6^{th}$ octets of the Z-bit field 58, it is also possible to assemble the internal message using other octets.

FIGS. 3A and 3B illustrate formats of the internal message transmitted from the remote terminal 30 to the MDSL terminal 40. More specifically, FIG. 3A illustrates an internal message format for the IDLC mode, and FIG. 3B illustrates an internal message format for the UDLC mode.

Referring to FIG. 3A, the first bits ACT1 and ACT2 in the $4^{th}$ and $5^{th}$ octets define information fields for ordering activation of the voice port #1 and the voice port #2. If the user sends a call service request to the telephone office, the exchange 10 sets a voice port activation order to ACT='1'. The second bits '1' in the $4^{th}$ and $5^{th}$ octets define information fields indicating the IDLC mode, and are set by the exchange 10. The third bits MB1 (make busy #1) and MB2 define information fields indicating a call service interruption due to line disconnection and a failure of the exchange and transmission equipment, and are set to MB='1' when the call service is interrupted. The $4^{th}$ to $7^{th}$ bits in the $4^{th}$ and $5^{th}$ octets define ring type information fields RING_TYPE including rate information and ring tone information. The final bits RING1 and RING2 in the $4^{th}$ and $5^{th}$ octets define ring information fields, which are set when providing a ring to the end user. In FIG. 3A, a byte CHECK_SUM of the $6^{th}$ octet defines an information field in which check sum data for error check is registered.

Referring to FIG. 3B, the first bits ACT1 and ACT2 in the $4^{th}$ and $5^{th}$ octets define information fields for ordering activation of the voice port #1 and the voice port #2, and the second bits '0' define information fields indicating the UDLC mode. The $3^{rd}$ bits MB1 and MB2 in the $4^{th}$ and $5^{th}$ octets define information fields indicating the call service interruption. The $4^{th}$ to $7^{th}$ bits 'A1, B1, C1, D1' and 'A2, B2, C2, D2' in the $4^{th}$ and $5^{th}$ octets define signaling signal information fields. The final bits in the $4^{th}$ and $5^{th}$ octets define unused information fields. If the user hooks off the user terminal, the MDSL terminal 40 changes the signaling signals 'A, B, C, D' from the hook-on state '1, 0, 0, 1' to the hook-off state '0, 0, 0, 1', and transmits the changed signaling signals to the exchange 10. The exchange 10 then transmits the changed signaling signals 'A, B, C, D' of '0, 0, 0, 1' to the MDSL terminal 40 as an acknowledge signal. During the call service, the signaling signal and the acknowledge signal are constantly exchanged. In FIG. 3B, a byte CHECK_SUM of the $6^{th}$ octet defines an information field in which check sum data for error check is registered.

Figure 4A:
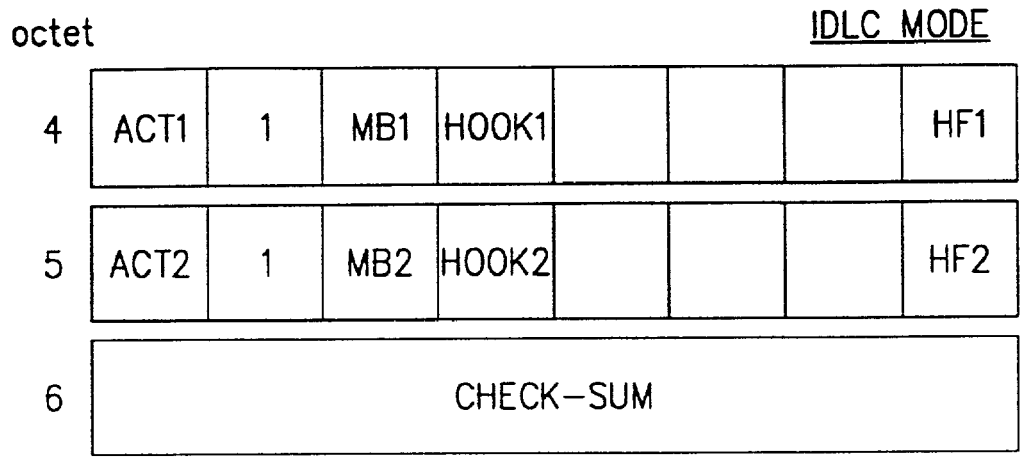
FIGS. 4A and 4B are diagrams illustrating a format of an internal message transmitted from the multirate digital subscriber line (MDSL) terminal to the remote terminal, in accordance with the principles of the present invention.
Figure 4B:
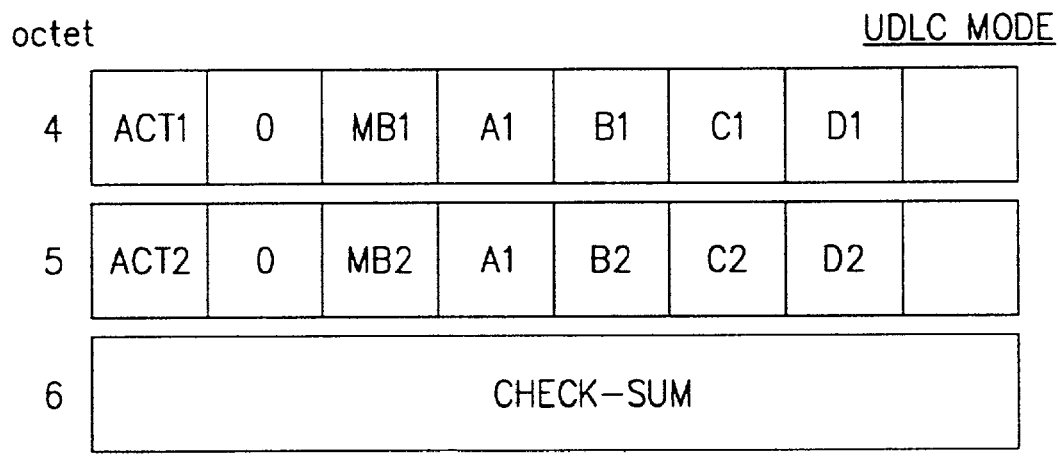

FIGS. 4A and 4B illustrate formats of the internal message transmitted from the MDSL terminal 40 to the remote terminal 30. More specifically, FIG. 4A illustrates an internal message format for the IDLC mode, and FIG. 4B illustrates an internal message format for the UDLC mode.

Referring to FIG. 4A, the first bits ACT1 and ACT2 in the $4^{th}$ and $5^{th}$ octets define information fields for ordering activation of the voice port #1 and the voice port #2. If the user sends a call service request to the telephone office, the exchange 10 sets a voice port activation order to ACT='1'. The second bits '1' in the $4^{th}$ and $5^{th}$ octets define information fields indicating the IDLC mode, and are set by the exchange 10. The third bits MB1 and MB2 define information fields indicating a call service interruption due to line disconnection and a failure of the exchange and transmission equipment, and are set to MB='1' when the call service is interrupted. The $4^{th}$ bits HOOK1 and HOOK2 in the $4^{th}$ and $5^{th}$ octets define information fields indicating hook-off of the user terminal. Information fields defined by the $5^{th}$ to $7^{th}$ bits are empty. The final bits HF1 and HF2 define information fields, which are set when the terminal user flashes the hook. In FIG. 4A, a byte CHECK_SUM of the $6^{th}$ octet defines a field in which check sum data for error check is registered. The internal message format of FIG. 4B is identical to the internal message format of FIG. 3B. Thus, the detailed description will not be made.

Now, an operation of the present invention will be described in detail. The two binary, one quarternary (2B1Q) multirate digital subscriber line (MDSL) system according to an embodiment of the present invention can surely provide a high-speed data service, since it is based on the two binary, one quarternary (2B1Q) multirate symmetric digital subscriber line (MSDSL) system. Therefore, the detailed description of this will be omitted. Herein, the description will be focused on an operation of transmitting the voice data using the HDSL overhead (HOH) bits included in the HDSL frame format.

(1) IDLC Mode

Figure 5:
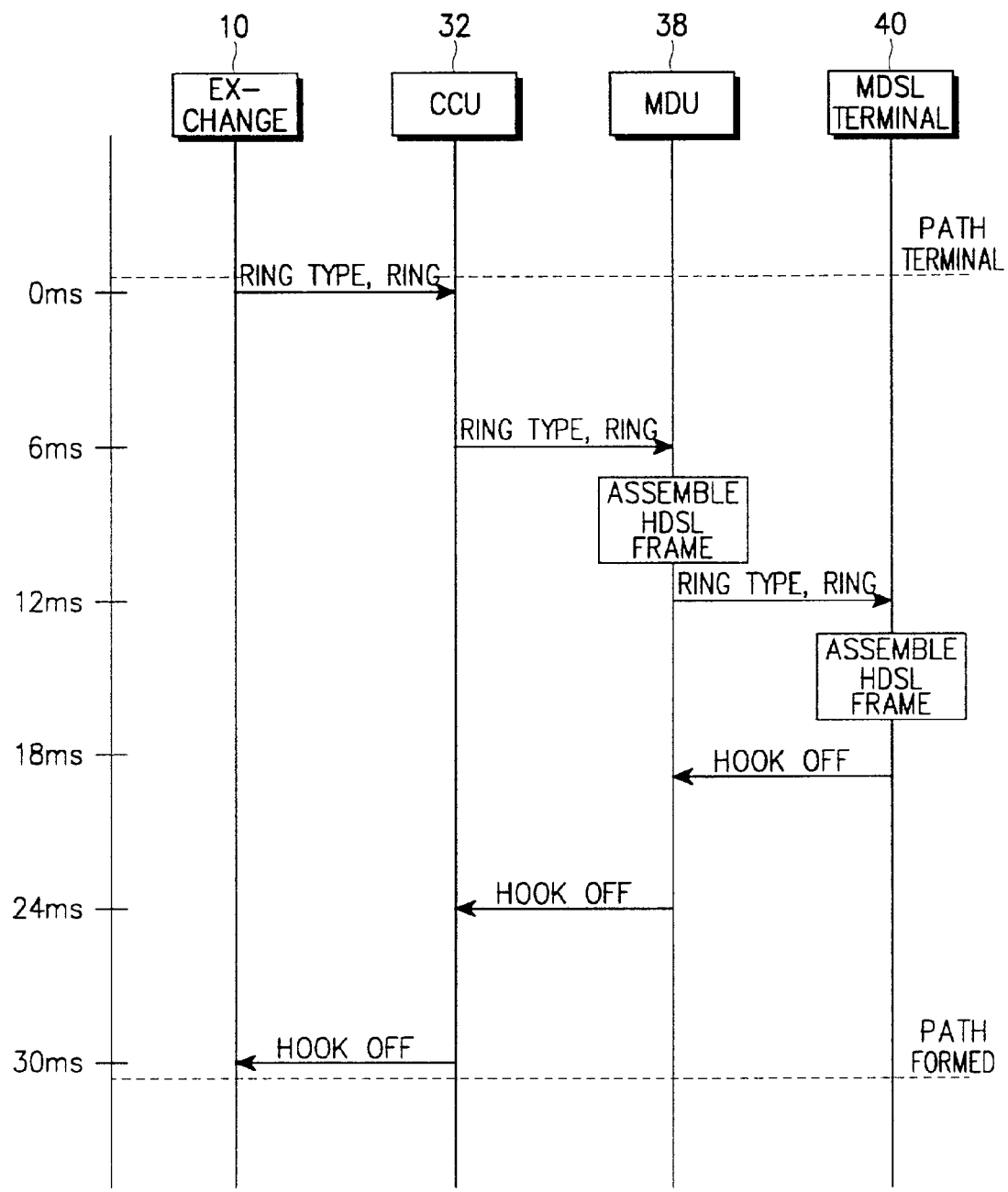
FIG. 5 is a flow diagram illustrating a procedure for processing an internal message, in accordance with the principles of the present invention.

First, an operation of the integrated digital line circuit (IDLC) mode will be described with reference to FIGS. 1, 2, 3A, 4A and 5. FIG. 5 illustrates a procedure for processing voice signaling signals in the exchange 10, the CCU 32, the MDU 38 and the MDSL terminal 40.

If the calling subscriber makes a phone call to the telephone 42 connected to the MDSL terminal 40, the exchange 10 transmits ring type information RING_TYPE and ring information RING1 or RING2 to the CCU 32 through the central office 20, the E1/T1 trunk 60, and the CTU 34 and the C-bus 36 in the remote terminal 30. The CCU 32 provides the ring type information RING_TYPE and the ring information RING to the MDU 38 via the C-bus 36, after performing a signaling process for the IDLC mode.

The MDU 38 in the remote terminal 30 assembles the $4^{th}$ and $5^{th}$ octet bytes of the Z-bit field 58 shown in FIG. 3A, using the information previously provided from the exchange 10, i.e., the voice port activation order information and the IDLC mode indication information, and the ring type information RING_TYPE and the ring information RING, provided from the CCU 32. Further, the MDU 38 creates the check sum data by locally adding the $4^{th}$-octet data and the $5^{th}$-octet data of Z-bit field 58, and registers the created check sum data in the check sum field CHECK_SUM of the $6^{th}$ octet. The MDU 38 constructs the above Z-bit field 58, includes the constructed Z-bit field in the HDSL frame, and then transmits the HDSL frame to the MDSL terminal 40 through one twisted pair copper line 50.

The MDSL terminal 40 checks the Z-bit field 58 of the HOH-bit field 54 in the HDSL frame transmitted from the remote terminal 30 every 6 ms by a 6 ms-interrupt process routine. If there exists data in the $4^{th}$ to $6^{th}$ octet bytes of the Z-bit field 58, the MDSL terminal 40 performs a check sum operation on the $4^{th}$ and $5^{th}$-octet data, and then, determines whether the resulting check sum data is equal to the check sum data registered in the check sum field of the $6^{th}$ octet. If they are equal to each other, the MDSL terminal 40 searches an activated port depending on the ACT information existing in the first bits of the $4^{th}$ and $5^{th}$ octet bytes of the Z-bit field 58, and then, provides a ring signal to the telephone 42 using the ring type information RING_TYPE and the ring information RING of the activated port.

If the user of the telephone 42 picks up the handset at the sound of the ring tone, the telephone 42 is hooked off, transmitting a hook-off signal to the MDSL terminal 40. Upon detecting the hook-off signal received through the voice port associated with the telephone 42, the MDSL terminal 40 sets, to '1', a hook bit HOOK of an octet associated with the voice port through which the hook-off signal was received, out of the $4^{th}$ and $5^{th}$ octets of the Z-bit field in the HDSL frame, shown in FIG. 4A. For example, if the hook-off signal was received through the voice port #1, the MDSL terminal 40 sets the HOOK1 bit existing in the $4^{th}$ octet of the Z-bit field 50 in the HDSL frame to '1' (see FIG. 4A). In FIG. 4A, the first-bit values ACT1 and ACT2 of the $4^{th}$ and $5^{th}$ octets and the second-bit values '1' indicating the IDLC mode are previously provided to the MDSL terminal 40 by the exchange 10, and the binary state values are set according to these values. Thereafter, the MDSL terminal 40 creates the check sum data by logically adding the $4^{th}$-octet data and the $5^{th}$-octet data of the Z-bit field 58, and registers the created check sum data in the check sum field of the $6^{th}$ octet. In this method, the MDSL terminal 40 constructs the Z-bit field 58 of the HDSL frame and transmits the HDSL frame with the Z-bit field 58 to the remote terminal 30 through one twisted pair copper line 50.

The MDU 38 in the remote terminal 30 checks the Z-bit field 58 of the HOH-bit field 54 in the HDSL frame from the MDSL terminal 40 every 6 ms by means of the 6 ms-interrupt process routine. If there exists data in the $4^{th}$ to $6^{th}$ octet bytes of the Z-bit field 58, the MDU 38 performs a check sum operation on the $4^{th}$ and $5^{th}$-octet data, and determines whether the resulting check sum data is equal to the check sum data registered in the check sum field of the $6^{th}$ octet. If they are equal to each other, the MDU 38 reads hook-off information HOOK of the activated port using the ACT information existing in the first bits of the $4^{th}$ and $5^{th}$ octet bytes of the Z-bit field 58. The CCU 32 provides the hook-off information HOOK to the exchange 10 through the C-bus 36, the CTU 34, the E1/T1 trunk 60 and the central office 20, after performing a signaling process for the IDLC mode.

(2) UDLC Mode

Next, an operation of the universal digital line circuit (UDLC) mode will be described with reference to FIGS. 1, 2, 3B and 4B. If the calling subscriber makes a phone call to the telephone 42 connected to the MDSL terminal 40, the exchange 10 transmits signaling signals A, B, C and D indicting a call service state to the MDU 38 through the central office 20, the E1/T1 trunk 60, and the CTU 34 in the remote terminal 30. The signaling signals A, B, C and D are normally used all, but when necessary, only the signaling signals A and B can be used. This is because it is possible to distinguish the signaling signals 'A, B, C, D' of '1, 0, 0, 1' in the non-call service state (i.e., hook-on state) from the signaling signals 'A, B, C, D' of '0, 0, 0, 1' in the call service state (i.e., hook-off state), even with only the signaling signals 'A, B'.

The MDU 38 in the remote terminal 30 constructs the $4^{th}$ and $5^{th}$ octet bytes of the Z-bit field 58 shown in FIG. 3B, using the information previously provided from the exchange 10, i.e., the voice port activation order information and the UDLC mode indication information, and the signaling signals 'A, B, C, D', creates check sum data by logically adding the $4^{th}$-octet data and the $5^{th}$-octet data of the Z-bit field 58, and then, registers the created check sum data in the check sum field CHECK_SUM of the $6^{th}$ octet. The MDU 38 constructs the Z-bit field 58 in the above format, includes the constructed Z-bit field in the HDSL frame, and then transmits the HDSL frame to the MDSL terminal 40 through one twisted pair copper line 50.

The MDSL terminal 40 checks the Z-bit field 58 of the HOH-bit field 54 in the HDSL frame transmitted from the remote terminal 30 every 6 ms by means of the 6 ms-interrupt process routine. If there exists data in the $4^{th}$ to $6^{th}$ octet bytes of the Z-bit field 58, the MDSL terminal 40 performs a check sum operation on the $4^{th}$ and $5^{th}$-octet data, and then, determines whether the resulting check sum data is equal to the check sum data registered in the check sum field of the $6^{th}$ octet. If they are equal to each other, the MDSL terminal 40 searches an activated port depending on the ACT information existing in the first bits of the $4^{th}$ and $5^{th}$ octet bytes of the Z-bit field 58, and then, provides a ring signal to the telephone 42 using the signaling signals A, B, C and D of the activated port.

If the user of the telephone 42 picks up the handset at the sound of the ring tone, the telephone 42 is hooked off, transmitting a hook-off signal to the MDSL terminal 40. Upon detecting the hook-off signal received through the voice port associated with the telephone 42, the MDSL terminal 40 sets, to the previous state, a binary state of the signaling signals 'A, B, C, D' of an octet associated with the voice port through which the hook-off signal was received, out of the $4^{th}$ and $5^{th}$ octets of the Z-bit field 58 in the HDSL frame, shown in FIG. 4A. For example, if the hook-off signal was received through the voice port #1, the MDSL terminal 40 sets the signaling signal bits 'A, B, C, D' existing in the $4^{th}$ octet of the Z-bit field 50 in the HDSL frame to '0, 0, 0, 1' (see FIG. 4B). In FIG. 4B, the first-bit values ACT1 and ACT2 of the $4^{th}$ and $5^{th}$ octets and the second-bit values '0' indicating the UDLC mode are previously provided to the MDSL terminal 40 by the exchange 10, and the binary state values are set according to these values. Thereafter, the MDSL terminal 40 creates the check sum data by logically adding the $4^{th}$-octet data and the $5^{th}$-octet data of the Z-bit field 58, and registers the created check sum data in the check sum field of the $6^{th}$ octet. In this method, the MDSL terminal 40 constructs the Z-bit field 58 of the HDSL frame and transmits the HDSL frame with the Z-bit field 58 to the MDU 38 in the remote terminal 30 through one twisted pair copper line 50.

The MDU 38 in the remote terminal 30 checks the Z-bit field 58 of the HOH-bit field 54 in the HDSL frame from the MDSL terminal 40 every 6 ms by means of the 6 ms-interrupt process routine. If there exists data in the $4^{th}$ to $6^{th}$ octet bytes of the Z-bit field 58, the MDU 38 performs a check sum operation on the $4^{th}$ and $5^{th}$-octet data, and determines whether the resulting check sum data is equal to the check sum data registered in the check sum field of the octet. If they are equal to each other, the MDU 38 reads the signaling signals 'A, B, C, D' of the activated port using the ACT information existing in the first bits of the $4^{th}$ and $5^{th}$ octet bytes of the Z-bit field 58, and then, provides the read signaling signals 'A, B, C, D' to the exchange 10 through the CTU 34, the E1/T1 trunk 60 and the central office 20. Subsequently, a communication path is formed.

As described above, the present invention can provide both a voice service and a data service with a single card capable of accepting both the existing voice service card and the existing data service card. In addition, the invention covers every existing service type, thus making it possible to decrease the cost. Furthermore, the novel method can meet an increasing demand for the Internet service and can be applied to an existing IDLC/UDLC telephone.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. A method, comprising:
providing high speed data services and voice services in a transmission system employing two binary, one quaternary modulation/demodulation, said transmission system including a remote terminal providing a high-speed data service, a plurality of user terminals including data service terminals and voice service terminals, and a multirate digital subscriber line terminal connected to said remote terminal through a twisted pair line, said multirate digital subscriber line terminal being connected to said user terminals, said voice services including upstream and downstream voice services;
during said downstream voice service, assembling, in said remote terminal, a first high bit rate digital subscriber line frame by including signaling signals for said voice service and signal processing mode information in a user-defined interval of said first high bit rate digital subscriber line frame, and transmitting said assembled first high bit rate digital subscriber line frame to said multirate digital subscriber line terminal through said twisted pair line; and
during said upstream voice service, receiving, in said remote terminal, a second high bit rate digital subscriber line frame and transmitting signaling signals in said received second high bit rate digital subscriber line frame to an exchange.

2. The method of claim 1, said user-defined interval being an overhead interval of said first high bit rate digital subscriber line frame.

3. The method of claim 2, further comprising:
connecting said user terminals to said multirate digital subscriber line terminal;
connecting said multirate digital subscriber line terminal to said twisted pair line;
connecting said twisted pair line to said remote terminal;
connecting said remote terminal to a central office; and
connecting said central office to said exchange.

4. The method of claim 3, further comprising transmitting information between said remote terminal and said central office over an E1/T1 trunk.

5. The method of claim 4, said downstream voice service corresponding to a telephone call to at least one of said voice service terminals.

6. The method of claim 4, said upstream voice service corresponding to a telephone call from at least one of said voice service terminals.

7. The method of claim 1, said user-defined interval including voice port activation order information, call service interruption information, and error check information.

8. The method of claim 7, further comprising:
connecting said user terminals to said multirate digital subscriber line terminal;
connecting said multirate digital subscriber line terminal to said twisted pair line;
connecting said twisted pair line to said remote terminal;
connecting said remote terminal to a central office; and
connecting said central office to said exchange.

9. The method of claim 8, further comprising transmitting information between said remote terminal and said central office over an E1/T1 trunk.

10. The method of claim 9, said downstream voice service corresponding to a telephone call to at least one of said voice service terminals.

11. The method of claim 10, said upstream voice service corresponding to a telephone call from at least one of said voice service terminals.

12. The method of claim 1, further comprising:
connecting said user terminals to said multirate digital subscriber line terminal;
connecting said multirate digital subscriber line terminal to said twisted pair line;
connecting said twisted pair line to said remote terminal;
connecting said remote terminal to a central office; and
connecting said central office to said exchange.

13. The method of claim 12, further comprising transmitting information between said remote terminal and said central office over an E1/T1 trunk.

14. The method of claim 1, said downstream voice service corresponding to a telephone call to at least one of said voice service terminals.

15. The method of claim 1, said upstream voice service corresponding to a telephone call from at least one of said voice service terminals.

16. A method, comprising:
forming a transmission system providing high speed data services and voice services, said transmission system including a multirate digital subscriber line terminal, a plurality of data terminals and voice terminals, and a remote terminal providing said high speed data services, said voice terminals including a first voice terminal;
receiving a first high bit rate digital subscriber line frame in said multirate digital subscriber line terminal during a downstream voice service, said first high bit rate digital subscriber line frame being assembled to include signaling signals for said voice service and signal processing mode information in a user-defined interval of said first high bit rate digital subscriber line frame, said first high bit rate digital subscriber line frame being assembled by said remote terminal;
coupling said signaling signals to said first voice terminal;
when a voice service response and request is received from said first voice terminal, assembling a second high bit rate digital subscriber line frame by including signaling signals for said voice service and signal processing mode information in a user-defined interval of said second high bit rate digital subscriber line frame; and
transmitting said second high bit rate digital subscriber line frame.

17. The method of claim 16, further comprising employing two binary, one quarternary modulation/demodulation in said transmission system.

18. The method of claim 17, said plurality of data terminals and voice terminals corresponding to a plurality of user terminals.

19. The method of claim 17, said multirate digital subscriber line terminal being connected to said plurality of data terminals and voice terminals.

20. The method of claim 19, further comprising:
connecting said multirate digital subscriber line terminal to a remote terminal through a twisted pair line, said assembling of said first high bit rate digital subscriber line frame being performed by said remote terminal; and
transmitting said first high bit rate digital subscriber line frame from said remote terminal to said multirate digital subscriber line terminal.

21. The method of claim 20, further comprising:
said assembling of said second high bit rate digital subscriber line frame being performed by said multirate digital subscriber line terminal; and
transmitting said second high bit rate digital subscriber line frame from said multirate digital subscriber line terminal to said remote terminal through said twisted pair line.

22. The method of claim 21, further comprising:
connecting said remote terminal to a central office; and
connecting said central office to an exchange.

23. The method of claim 22, further comprising transmitting information between said remote terminal and said central office over an E1/T1 trunk.

24. The method of claim 23, said downstream voice service corresponding to a telephone call to said first voice terminal.

25. The method of claim 24, said transmitting of said second high bit rate digital subscriber line frame from said multirate digital subscriber line terminal to said remote terminal being a part of an upstream voice service.

26. The method of claim 16, said plurality of data terminals and voice terminals corresponding to a plurality of user terminals.

27. The method of claim 16, said multirate digital subscriber line terminal being connected to said plurality of data terminals and voice terminals.

28. The method of claim 16, further comprising:
connecting said multirate digital subscriber line terminal to a remote terminal through a twisted pair line, said assembling of said first high bit rate digital subscriber line frame being performed by said remote terminal; and
transmitting said first high bit rate digital subscriber line frame from said remote terminal to said multirate digital subscriber line terminal.

29. The method of claim 16, further comprising:
said assembling of said second high bit rate digital subscriber line frame being performed by said multirate digital subscriber line terminal; and
transmitting said second high bit rate digital subscriber line frame from said multirate digital subscriber line terminal to a remote terminal through a twisted pair line.

30. The method of claim 29, further comprising:
connecting said remote terminal to a central office; and
connecting said central office to an exchange.

31. The method of claim 30, further comprising connecting said remote terminal and said central office with an E1/T1 trunk.

32. The method of claim 16, said downstream voice service corresponding to a telephone call to said first voice terminal.

33. The method of claim 16, a telephone call from said first voice terminal corresponding to an upstream voice service.

34. The method of claim 16, said transmitting of said second high bit rate digital subscriber line frame from said multirate digital subscriber line terminal to said remote terminal being a part of an upstream voice service.

35. The method of claim 16, said user-defined interval of said first and second high bit rate digital subscriber line frames being an overhead interval of said frames.

36. The method of claim 35, further comprising employing two binary, one quarternary modulation/demodulation in said transmission system.

37. The method of claim 35, said plurality of data terminals and voice terminals corresponding to a plurality of user terminals.

38. The method of claim 35, further comprising:
connecting said multirate digital subscriber line terminal to a remote terminal through a twisted pair line, said assembling of said first high bit rate digital subscriber line frame being performed by said remote terminal; and
transmitting said first high bit rate digital subscriber line frame from said remote terminal to said multirate digital subscriber line terminal.

39. The method of claim 35, said downstream voice service corresponding to a telephone call to said first voice terminal.

40. The method of claim 35, said transmitting of said second high bit rate digital subscriber line frame from said multirate digital subscriber line terminal to said remote terminal being a part of an upstream voice service.

41. The method of claim 36, said multirate digital subscriber line terminal being connected to said plurality of data terminals and voice terminals.

42. The method of claim 36, further comprising:
said assembling of said second high bit rate digital subscriber line frame being performed by said multirate digital subscriber line terminal; and
transmitting said second high bit rate digital subscriber line frame from said multirate digital subscriber line terminal to a remote terminal through a twisted pair line.

43. The method of claim 42, further comprising:
connecting said remote terminal to a central office; and
connecting said central office to an exchange.

44. The method of claim 43, further comprising transmitting information between said remote terminal and said central office through an E1/T1 trunk.

45. The method of claim 36, a telephone call from said first voice terminal corresponding to an upstream voice service.

46. The method of claim 16, said user-defined interval of said first and second high bit rate digital subscriber line frames including voice port activation order information, call service interruption information, and error check information.

47. The method of claim 46, said multirate digital subscriber line terminal being connected to said plurality of data terminals and voice terminals.

48. The method of claim 46, further comprising:
said assembling of said second high bit rate digital subscriber line frame being performed by said multirate digital subscriber line terminal; and transmitting said second high bit rate digital subscriber line frame from said multirate digital subscriber line terminal to a remote terminal through a twisted pair line.

49. The method of claim 48, further comprising:
connecting said remote terminal to a central office; and
connecting said central office to an exchange.

50. The method of claim 49, further comprising connecting said remote terminal and said central office with an E1/T1 trunk.

51. The method of claim 46, a telephone call from said first voice terminal corresponding to an upstream voice service.

52. The method of claim 46, further comprising employing two binary, one quarternary modulation/demodulation in said transmission system.

53. The method of claim 52, said plurality of data terminals and voice terminals corresponding to a plurality of user terminals.

54. The method of claim 52, further comprising:
connecting said multirate digital subscriber line terminal to a remote terminal through a twisted pair line, said assembling of said first high bit rate digital subscriber line frame being performed by said remote terminal; and
transmitting said first high bit rate digital subscriber line frame from said remote terminal to said multirate digital subscriber line terminal.

55. The method of claim 52, said downstream voice service corresponding to a telephone call to said first voice terminal.

56. The method of claim 52, said transmitting of said second high bit rate digital subscriber line frame from said multirate digital subscriber line terminal to said remote terminal being a part of an upstream voice service.

57. An apparatus, comprising:
a transmission system employing two binary, one quaternary modulation/demodulation and providing high speed data services and voice services, said transmission system comprising:
a remote terminal providing a high-speed data service;
a plurality of user terminals including data service terminals and voice service terminals;
a multirate digital subscriber line terminal being connected to said remote terminal through a twisted pair line, and being connected to said user terminals;
when said voice services correspond to a downstream voice service, said remote terminal assembling a first high bit rate digital subscriber line frame by including signaling signals for said downstream voice service and signal processing mode information in a user-defined interval of said first high bit rate digital subscriber line frame, and said remote terminal transmitting said assembled first high bit rate digital subscriber line frame to said multirate digital subscriber line terminal through said twisted pair line; and
when said voice services correspond to an upstream voice service, said remote terminal receiving a second high bit rate digital subscriber line frame and transmitting signaling signals in said received second high bit rate digital subscriber line frame to an exchange.

58. The apparatus of claim 57, said user-defined interval being an overhead interval of said first high bit rate digital subscriber line frame.

59. The apparatus of claim 57, said user-defined interval including voice port activation order information, call service interruption information, and error check information.

60. The apparatus of claim 58, said first high bit rate digital subscriber line frame further comprising:
a sync signal field, a plurality of time slot fields, and said overhead interval;
said overhead interval corresponding to a high bit rate digital subscriber line overhead bit field including an embedded operation communication field and a z-bit field; and
said z-bit field being defined by a user.

61. The apparatus of claim 60, said z-bit field being comprised of 8 octets.

62. The apparatus of claim 60, said transmission system utilizing at least one mode selected from among a universal digital line circuit mode implementing signal processing by hardware and an integrated digital line circuit mode implementing signal processing by software.

* * * * *